United States Patent

Farmer et al.

[15] 3,646,347
[45] Feb. 29, 1972

[54] METHOD AND APPARATUS FOR MEASURING RADIATION

[72] Inventors: Bobby Joe Farmer; Jim Howard Johnson, both of Arlington, Tex.

[73] Assignee: Advanced Technology Center, Inc., Grand Prairie, Tex.

[22] Filed: Dec. 2, 1968

[21] Appl. No.: 780,511

[52] U.S. Cl. .................................. 250/83.3 R, 250/71.5 R
[51] Int. Cl. ........................................................ G01t 1/16
[58] Field of Search ............................ 250/71.5, 83.3, 83.6

[56] References Cited

UNITED STATES PATENTS 3,221,165  11/1965  Goodale et al. ...................... 250/83.6
3,270,205   8/1966  Ladd et al. ........................ 250/83.6 X

OTHER PUBLICATIONS

William J. Price, Nuclear Radiation Detection, p. 89, Second Edition, 1964, McGraw-Hill Book Company.

Primary Examiner—James W. Lawrence
Assistant Examiner—Davis L. Willis
Attorney—John A. Weygandt and H. C. Goldwire

[57] ABSTRACT

A method of measuring radiation dose in real time comprising the steps of measuring incident radiation with a spectrometer and weighting the radiation signal of the spectrometer with a pulse-height-to-dose conversion function.

19 Claims, 4 Drawing Figures

BOBBY JOE FARMER
JIM HOWARD JOHNSON
INVENTORS

BY *John A. Weygandt*
ATTORNEY

BOBBY JOE FARMER
JIM HOWARD JOHNSON
INVENTORS

BY John A. Weygandt
ATTORNEY

METHOD AND APPARATUS FOR MEASURING RADIATION

This invention relates to dosimetry, and more particularly to measuring dose rate directly from a radiation spectrometer and substantially simultaneously with the analysis of radiation by the spectrometer, i.e., in real time.

Users of radioactive materials and others exposed to these and other sources of radiation must take adequate measures to prevent overexposure and thereby avoid injury. An adequate radiation-protection program requires rapid and accurate means for measuring radiation does. The absorbed dose of any ionizing radiation in any material is defined as the energy absorbed per unit mass of the material. The unit is the rad and is equal to 100 ergs per gram of the absorber. Thus, rad is independent of the type of radiation being absorbed. The effect of ionizing radiation on living organisms is expressed in rem and depends on the type and energy of the absorbed radiation. Accordingly, it is apparent that it is desirable to have, as currently as possible, adequate information about dose.

For many years, attempts have been made to measure physical dose in radiation fields in order to predict radiation effects. In the interest of simplicity, developments have tended toward integrating devices so that a single number, signifying dose, can be read directly from the measuring system. Direct-reading dosimeters usually utilize ionization chambers or solid state detectors. The reliability of the measurements from these devices is dependent upon the validity of the assumptions that the system is wholly responsive to energy deposited, the response is independent of radiation quality, and the calibrated and measured fields are equivalent. Such a device yields a single value (i.e., physical dose) which, to be interpreted in terms of biological effect, must be converted to biological dose. Since it is generally accepted that biological dose is a function of radiation type and energy, no relationship can be established between the measured physical dose and the biological dose unless the radiation types and spectra are considered. No system is currently available which does distinguish particle type and spectra and directly does read out dose.

Nuclear radiation hazards arise from a wide variety of sources and take a number of forms. Generally of concern for radiological monitoring are alpha particles, beta particles, gamma rays, and X-rays. Alpha particles are positively charged nuclear particles identical with the nuclei of helium atoms and ejected at high speeds in certain radioactive transformations. Beta particles are fast-moving, charged particles emitted from the nuclei of atoms during radioactive decay and classified as positrons and negatrons, the latter being identical with atomic electrons. Gamma rays are photons (electromagnetic radiation) emitted spontaneously from certain atomic nuclei as a result of rearrangements within the nuclei leading to a lower energy content. X-rays are electromagnetic waves having wavelengths from about 0.006 to over 1,000 A. and usually generated as the result of energy transitions of atomic electrons caused by bombardment of a material of high atomic weight by high-energy electrons.

Various spectroscopic instruments have been developed to observe nuclear radiation. The term "spectrometer" is used herein to designate a spectroscopic device which is capable of resolving composite radiation and quantitatively analyzing it. For a detailed discussion of spectrometers, see Volume I of Alpha-, Beta- and Gamma-Ray Spectroscopy, edited by Kai Siegbahn, North-Holland Publishing Company, Amsterdam (1965).

In the particular case of spacecraft-environment radiation, the problem of radiation interpretation is a very complicated one. The measurement of the environment in terms of the various types of particles present and their energy distribution does not lend itself readily to dosimetric interpretation. The chief requirement for a radiation monitor in a manned space vehicle is that the instrument yield a direct indication of the absorbed dose in real time. Because of the complexity of using flux or even flux-plus-energy distribution to provide dosimetric information, it has heretofore been believed that the above requirement ruled out instruments that are only capable of measuring such data. See Journal of Spacecraft "Radiation Dosimetry Aboard Manned Space Vehicles" by N. A. Bailey et al., Aug. 1966, Volume 3, No. 8, pages 1,245–50, where it is argued that any system which does not employ tissue equivalent detectors could fulfill the requirements for dose information only through the use of a large number of expensive and complicated components. To render useful the information, once gathered, would then require processing of the information by an onboard computer if real-time information was to be obtained. These authors argue that only a tissue-equivalent system can perform the task.

It is true that dose rate measurements heretofore could not be made directly from a radiation spectrometer. In order to utilize the spectrometer as a real-time dosimeter, it is necessary to convert the pulse-height spectrum to physical dose. (The pulse-height spectrum may be thought of as merely an accumulation of output signals from the spectrometer.) The pulse-height spectrum, or actual reading of the spectrometer, is not identical with the true spectrum of the incident radiation but is related thereto by a function which is a characteristic property of the particular spectrometer employed. This function is generally known as the response function and may be written as a matrix R. The conventional approach to this problem has been to multiply the pulse-height spectrum by the inverse of the spectrometer's response matrix $R^{-1}$ to obtain the true energy spectrum and then to apply energy-to-dose conversion numbers to the energy spectrum to produce a dose spectrum. The total dose is then produced from the sum of the doses from each energy channel of the spectrometer.

The procedure involved in computing dose from the spectrum accumulated by a spectrometer, using the matrix inverse technique, may be illustrated as follows. For simplicity of illustration, a spectrum of only three data points is presented. It should be appreciated that the complexity of this kind of treatment increases as the square of the number of data points in the measured spectrum. The following definitions are employed: $P$=the measured spectrum, i.e., the pulse-height spectrum or accumulation of output signals from the spectrometer; $R$=the response function, including the efficiency function $\epsilon$; $S$=the true spectrum; $d$=the spectrum-to-dose function, i.e., the known relationship between the true spectrum and physical dose; $D$=the dose spectrum; and $\Sigma D$=the total dose.

Assume that $P = \begin{bmatrix} .06 \\ .29 \\ .85 \end{bmatrix}$, a column matrix, and that $R = \begin{bmatrix} .06 & 0 & 0 \\ .01 & .14 & 0 \\ .01 & .02 & .8/3 \end{bmatrix}$, a square matrix.

An inverse of $R$ may be generated so that $R^{-1} R = 1$. namely $$R^{-1} = \begin{bmatrix} 10/.6 & 0 & 0 \\ \dfrac{-5}{6 \times .7} & \dfrac{5}{.7} & 0 \\ \dfrac{-3}{7 \times .8} & \dfrac{-3}{7 \times .8} & \dfrac{3}{.8} \end{bmatrix}.$$

Further assume that $d = \begin{bmatrix} 5 & 0 & 0 \\ 0 & 4 & 0 \\ 0 & 0 & 3 \end{bmatrix}$.

Since the measured spectrum P is actually a true spectrum S distorted by the resolution function of the spectrometer R, which includes the spectrometer's efficiency, P may be related to R and S by the expression $$P = R\,S. \tag{1}$$

The first step in the matrix inversion technique consists of converting equation (1) to $$S = R^{-1}P. \quad (2)$$

Substituting the values given above for $R^{-1}$ and $P$, one finds that $$S = \begin{bmatrix} \frac{10}{.6} & 0 & 0 \\ \frac{-5}{6 \times .7} & \frac{5}{.7} & 0 \\ \frac{-3}{7 \times .8} & \frac{-3}{7 \times .8} & \frac{3}{.8} \end{bmatrix} \times \begin{bmatrix} .06 \\ .29 \\ .85 \end{bmatrix} \quad (3)$$

To solve for $S$ in equation (3), it is necessary to perform the matrix multiplication term by term. The result is $$S = \begin{bmatrix} 1 \\ 2 \\ 3 \end{bmatrix} \quad (4)$$

The dose matrix $D$ is then obtained by multiplying the matrixes $d$ and $S$.

$$D = dS \quad (5)$$

$$D = \begin{bmatrix} 5 & 0 & 0 \\ 0 & 4 & 0 \\ 0 & 0 & 3 \end{bmatrix} \times \begin{bmatrix} 1 \\ 2 \\ 3 \end{bmatrix} = \begin{bmatrix} 5 \\ 8 \\ 9 \end{bmatrix} \quad (6)$$

Evaluation of the $D$ matrix by summing over the individual terms yields the total dose:

$$\Sigma D = 22 \quad (7)$$

As may be seen from the above, in order to generate the total dose, several matrix computations are required. The storage and application of the inverse of $R$ requires the use of a fairly large computer. Especially if radiation dose is being metered in a spacecraft, the difficulties involved in storing and using a large matrix on board become prohibitive.

Accordingly, a major object of the present invention is to provide a method of utilizing a spectrometer to measure absorbed dose in real time.

Another object is to avoid the direct application of the inverse of the spectrometer's response matrix in the measuring of dose in real time.

A further object is, where dose is to be measured in a space craft, to eliminate the necessity for storing the inverse of the spectrometer's response matrix in an onboard computer.

Other objects and advantages will be apparent from the specification and claims and from the accompanying drawing illustrative of the invention wherein:

Figure 1:
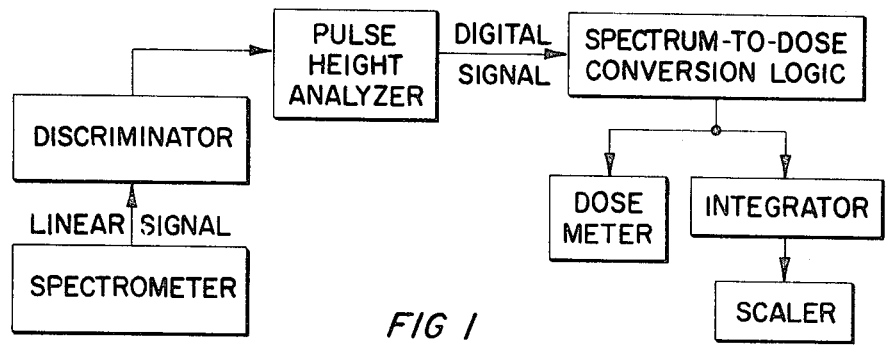
FIG. 1 depicts, in block diagram form, apparatus suitable for practicing the method of the simple case of a spectrometer which detects only one kind of radiation.

While, in the present invention, a radiation spectrometer forms a part of the dosimeter, the method eliminates the need for directly applying the inverse of the spectrometer's response matrix $R^{-1}$ to the measured spectrum and, where dose is to be metered in a spacecraft, the need for storing this matrix in an onboard computer. The present inventors have discovered that since the source spectrum is related (through a set of simultaneous linear equations) to the pulse-height spectrum by a function $R$, then the dose spectrum must be related to the pulse-height spectrum by another function which contains $R$, a known property, and the energy-to-dose conversion factor $d$, which is also known. Accordingly, there exists a single, predeterminable function for converting pulse-height spectra to dose. Hence, in the present invention, the pulse-height information is converted immediately into dose through the use of a simple function F which is determined empirically in advance of radiation measurements. This function $F$ is generated by solving a set of simultaneous linear equations which relates the pulse-height spectrum to dose. The set may be solved either by an exact method such as the application of matrix algebra or Kramer's rule (wherein each unknown is the ratio of two determinants), or by an approximate method such as a method of numerical iteration. This approach to real-time dosimetry may be most conveniently explained in terms of matrix algebra as follows.

Utilizing the same definitions of terms above, it can be shown that the total dose, $D$, may be obtained by simply multiplying each element of $P$, the pulse-height spectrum, by a weighting factor, the pulse-height-to-dose function $F$, and summing these in real time. The weighting function $F$ is derived from the inverse of the spectrometer's response matrix $R^{-1}$ and the spectrum-to-dose conversion function $d$ as follows.

Since $S = R^{-1}P$ [from (2)] and $$\Sigma D = dS \text{ [from (5)], then}$$

$$\Sigma D = dR^{-1}P.$$

By multiplying $d$ by $R^{-1}$, defining the columns of $dR^{-1}$ as I, J, and K, and summing down the columns:

$$dR^{-1} = \begin{bmatrix} 5 & 0 & 0 \\ 0 & 4 & 0 \\ 0 & 0 & 3 \end{bmatrix} \times \begin{bmatrix} \frac{10}{.6} & 0 & 0 \\ \frac{-5}{6 \times .7} & \frac{5}{.7} & 0 \\ \frac{-3}{7 \times .8} & \frac{-3}{7 \times .8} & \frac{3}{.8} \end{bmatrix}$$

$$= \begin{matrix} I & J & K \end{matrix}$$

$$= \begin{bmatrix} \frac{50}{.6} & 0 & 0 \\ \frac{-20}{6 \times .7} & \frac{20}{.7} & 0 \\ \frac{-9}{7 \times .8} & \frac{-9}{7 \times .8} & \frac{9}{.8} \end{bmatrix}$$

then $\Sigma I = 77$, $\Sigma J = 27$, and $\Sigma K = 11.25$.

Since $P$ has been designated as a column matrix, it may be written $$P = \begin{bmatrix} P_i \\ P_j \\ P_k \end{bmatrix}$$

then from equation (7) the total dose may be written $$\Sigma D = \left( \Sigma I \; \Sigma J \; \Sigma K \right) \begin{bmatrix} P_i \\ P_j \\ P_k \end{bmatrix} \quad (9)$$

$$\Sigma D = (\Sigma I)P_i + (\Sigma J)P_j + (\Sigma K)P_k. \quad (10)$$

Substituting the values of $P$, $I$, $J$, and $K$, then $$\Sigma D = 77(0.06) + 27(0.29) + 11.25(0.85) \quad (11)$$

and hence (to two significant figures), $$\Sigma D = 22 \quad (12)$$

Steps (10) and (11) illustrate the fact that the present method allows application of a single weighting factor—the pulse-height-to-dose function—to each element of $P$—the pulse-height spectrum—and the same result is obtained for $\Sigma D$, equation (12) as obtained by the more complex inverse matrix technique, equation (7).

The values $\Sigma I$, $\Sigma J$, and $\Sigma K$ are completely experimentally determined and amount to the square root of the number of terms in the response matrix $R$. The values of the elements $R^{-1}$ and $d$ of the function are known through detector calibration and energy-to-dose conversion data. By simply weighting the pulse-height spectrum according to the values of the pulse-height-to-dose function, one obtains a real-time dose reading. As may be seen from the above, the matrix summations, which are most practically carried out by computer, are performed prior to radiation measurement. This is particularly advantageous for dosimetry aboard a spacecraft, since an elaborate computer system is not required on board to reduce the experimental pulse-height spectrum to a dose.

When solving equation (8) using real data including, for example, a response matrix with 15 rows and columns, the functions derived by summing each column may not only be found to be erratic in nature, but some of the values may even be found to be negative. This result is apparently characteristic of the solutions of matrix equations where the inverse is used to solve for an unknown matrix. This characteristic is attributable to several causes: uncertainties in the response matrix; the many negative terms in the inverse; the tendency of the inverse to magnify small fluctuations; and the finitude of the terms in the matrix, i.e., the limited grid size.

Accordingly, an alternative approach to determining the weighting function $F$ which avoids the use of the inverse of $R$ may be taken as follows. $R$ may be represented as the product of a diagonal efficiency matrix $\epsilon$ and a normalized resolution matrix $N$. For the purpose of this application, a normalized matrix is one in which the sum of the elements of each row or the sum of the elements of each column equals 1. In the former case, the matrix is called row-normalized; in the latter case, the matrix is called column-normalized. Since $$F = R^{-1} d \qquad (13)$$

or $$F = N^{-1} \epsilon^{-1} d \qquad (14)$$

by multiplying both sides of equation (14) by $N$ $$NF = \epsilon^{-1} d \qquad (15)$$

where $N$ is a column-normalized matrix.

If $d$ is used as a column matrix composed of the nonzero elements of the original $d$ matrix, then $F$ becomes a column matrix equivalent to the weighting function. Equation (15) lends itself to a solution using s standard iterative process, for it indicates that there exists a function (or matrix) $F$ that, when multiplied by the response matrix $N$, gives $\epsilon^{-1}d$. The standard procedure in an iterative method is to start with a first approximation to the solution for the equation and to subject the approximate solution to a suitable process of refinement. The successive, approximate solutions converge to the true solution of the given equation. Hence, since $\epsilon^{-1}d$ is well known and $N$ is well known, by making an intelligent estimate of $F$, e.g., $F_1$ and multiplying the estimate by $N$, it is possible to compare the result with $\epsilon^{-1}d$. The degree of agreement between $NF_1$ and $\epsilon^{-1}d$ is a direct measure of the degree of agreement between $F_1$ and $F$. Thus, by successively correcting $F_1$ by the difference between $NF_1$ and $\epsilon^{-1}d$ and remultiplying the corrected $F_1$ (e.g., $F_2$, $F_3$, etc.) by $N_1$, an iteration is derived which generates a function $F_n$ which approaches $F$ when $(NF_n - \epsilon^{-1}d) = 0$.

Figure 2:
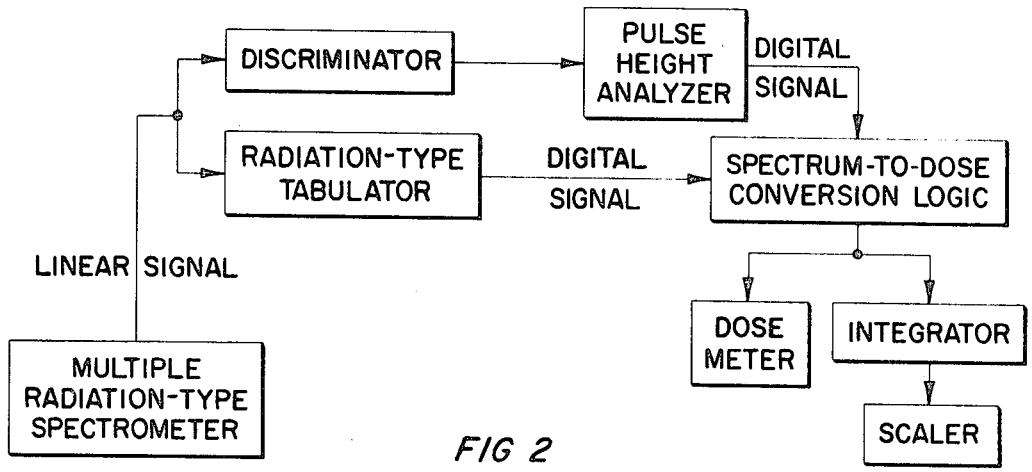
FIG. 2 depicts, in block diagram form, apparatus suitable for practicing the method of the invention for the case of a spectrometer which detects more than one kind of radiation.
Figure 3:
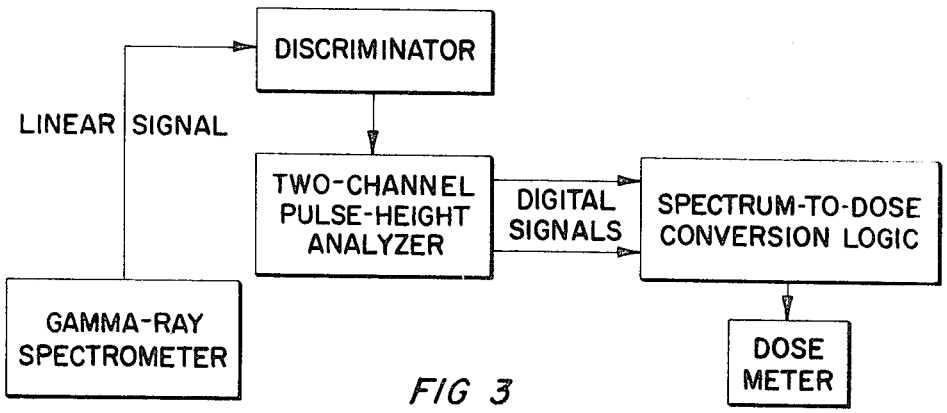
FIG. 3 depicts, in block diagram form, apparatus suitable for practicing the method of the invention for the specific case of a gamma-ray spectrometer.

Apparatus suitable for practicing the method of the invention is shown in block diagram form in FIGS. 1-3. FIG. 1 depicts apparatus for the simple case of a spectrometer which detects only one kind of radiation. The conversion and readout system comprises a discriminator containing lower and upper lever detectors so that noise and electrical pulses of excessive amplitude will not be analyzed by the pulse-height analyzer, which is essentially an analog to digital converter for transforming the pulse height of the linear or analog electrical signal from the spectrometer to a series of counts representative of pulse-height increments. This digital signal is then forwarded to spectrum-to-dose conversion logic where the predetermined weighting function, the pulse-height-to-dose function, is applied to the electrical, digital signal to convert it to dose pulses. The dose pulses are then applied to, for example, a variable range voltmeter for dose rate display. In order to read accumulated dose, a digital integrator circuit sums the series of pulses and the sum is converted to total dose by a scaler.

It is very often desirable or necessary to know not only the total dose of a single kind of radiation but also the total dose from several or all kinds of incident radiation. To accomplish this, one or more spectrometers are employed to measure the incident radiation. A straightforward method of converting this radiation spectrum to dose is to feed the linear signal containing information regarding the various kinds of radiation to a radiation-type discriminator which divides (that is, classifies) the signal into its various components. Each of these signals is then applied to a pulse-height analyzer and spectrum-to-dose converter. The dose rate signals from each component are then summed to give a total. Alternatively, circuitry of the type indicated in FIG. 2 may be employed. There, a part of the linear signal from the spectrometer is diverted to a tabulator which provides a digital signal to the spectrum-to-dose conversion logic, thus conveying information regarding the type of radiation so that the proper weighting function is applied to the digital signal from the pulse-height analyzer. In this manner, the dose rates for each type of radiation may be read from the spectrum-to-dose conversion logic and accumulated by the integrator and scaler to give total dose of each kind, or the dose rates may be summed and then accumulated to give the total dose from all the kinds of radiation measured.

FIG. 3 depicts, in block diagram form, particular apparatus suitable for practicing the method of the invention. The linear signal from a gamma-ray spectrometer is preferably directed through a discriminator to eliminate noise and electrical pulses of excessive amplitude. It will also be understood by those skilled in the art that because of variations in the spectrometer's response over the energy spectrum more precise results are achieved by using a pulse-height analyzer having several channels. For simplicity of illustration, however, only two channels are shown in the drawing. The two-channel pulse-height analyzer represented in FIG. 3 possesses three discrimination levels which break the spectra into two bins. Each channel of the analyzer transforms a pulse height of the analog electrical signal in one of the two bins to a digital signal. The two digital outputs are then fed to the spectrum-to-dose conversion logic which weights the outputs with the pulse-height-to-dose function and conveys the resulting voltage to a voltmeter calibrated to read dose in volts.

Figure 4:
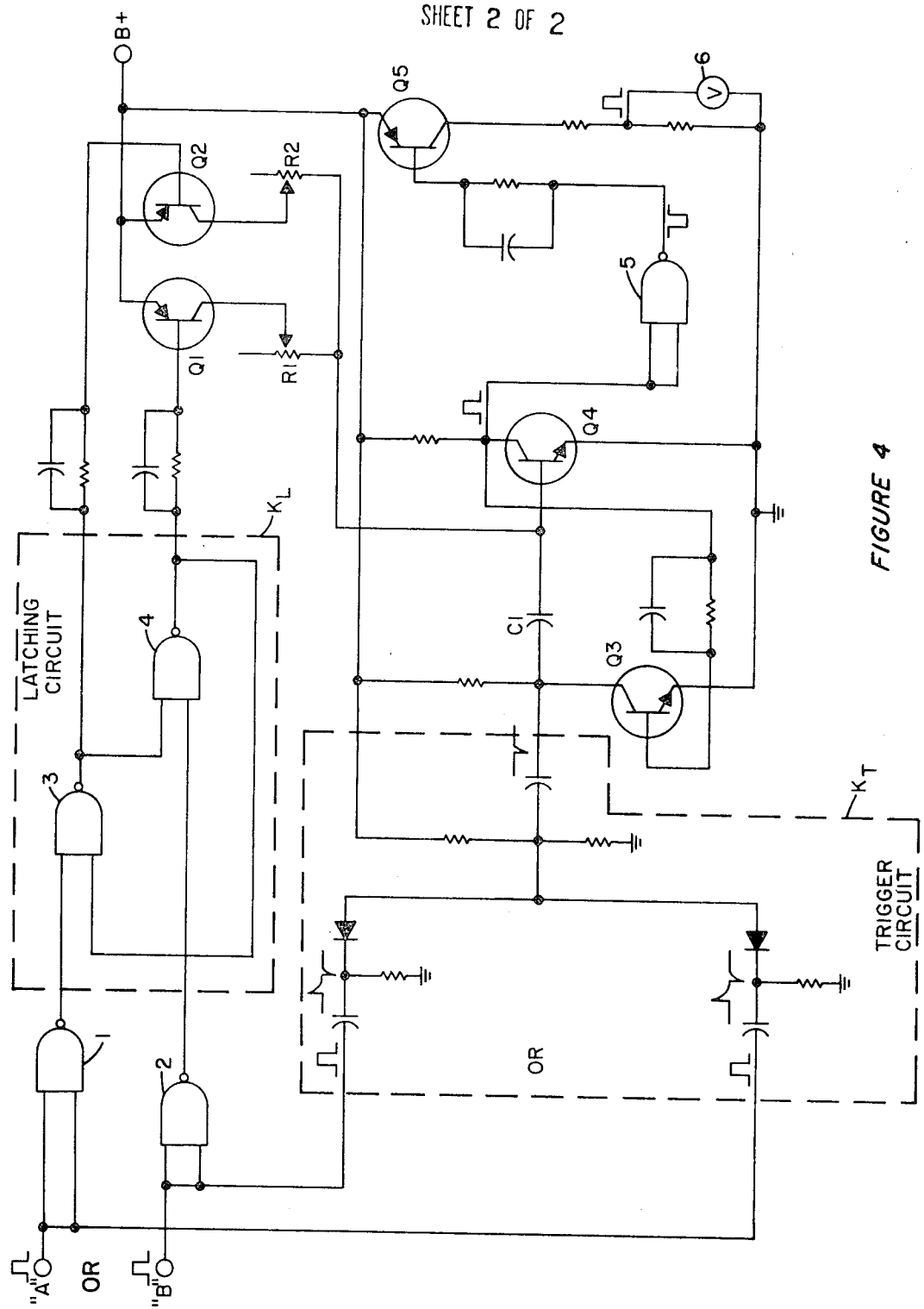
FIG. 4 depicts, in schematic diagram form, suitable circuitry for performing the spectrum-to-dose conversion function.

The gamma-ray spectrometer may be any device capable of detecting and quantatively analyzing gamma radiation. More particularly, it may be a beta-gamma spectrometer of the type disclosed in copending U.S. Pat. application Ser. No. 455,739, filed May 14, 1965 and now abandoned entitled "Beta-Gamma Spectrometer" and assigned to the assignee of the present application. The scintillation detector and photo multiplier described in the above-referenced patent application may be used in combination with, by way of example, certain instruments sold by ORTEC INCORPORATED, 100 Midland Road, Oak Ridge, Tennessee 37830, and more specifically with the ORTEC Model 410 Linear Amplifier and two ORTEC Model 420 Timing Single-Channel Analyzers. Suitable circuitry for the spectrum-to-dose conversion logic and dose meter is shown schematically in FIG. 4. The circuitry shown in FIG. 4 is intended as an example of a suitable embodiment and is not to be construed in a limiting sense. Various other means for performing the same electronic functions will occur to those skilled in the art without departing from the method of the invention.

In order to properly weight the electrical signals from the two pulse-height analyzers, the simple digital-to-analog conversion circuitry shown in FIG. 4 is used. This system produces an analog signal in the form of pulses of constant amplitude but of width proportional to the average dose assignable to the radiation detected in the particular energy channel or bin. A single pulse from one single-channel analyzer through path A or from the other single channel analyzer through path B sets a latching circuit which is circumscribed by dashed line $K_L$ in FIG. 4. Inverters 1 and 2 are used in front of the latching circuit to appropriately drive the "Nand"-gates 3 and 4 of the latching circuit. The latching circuit turns on either transistor Q1 or Q2, both of which act as switches. They connect variable resistors R1 and R2 respectively to the positive terminal of the voltage source. Resistors R1 and R2 (depicted as potentiometers) establish a specific time constant for the charge on capacitor C1 in the monostable circuits of transistors Q3 and Q4, and they may be adjusted to produce a wide range of pulse widths. A trigger circuit circumscribed by dashed line $K_T$, functions both as an "OR" gate and a pulse delay circuit. When a pulse is delivered from either single-channel analyzer, the circuit circumscribed by dashed line $K_T$ produces a trigger pulse for the monostable circuits of transistors Q3 and Q4 from the trailing edge of the analyzer output-signal. This delay is required to give the circuitry associated with transistors Q1 and Q2 adequate time to stabilize.

Pulses from transistors Q3 and Q4 are then inverted by the "Nand"-gate 5 to drive transistor Q5. From transistor Q5 is derived the output pulse which is, for example, 1 volt in amplitude. The output signal, which is a train of pulses of constant amplitude, is applied to a DC voltmeter 6 which indicates a voltage, the change in which represents the change in average pulse width of the output signal. The circuitry in FIG. 4 is calibrated by relating the voltmeter reading to the pulse width and frequency. The voltage read on the meter is intended to reflect the product of the width of the pulse measured in seconds and the repetition rate of the pulse measured in Hertz. Each single-channel analyzer in turn is caused to produce an output signal by a pulse from appropriate pulsing means of a selected amplitude and at a chosen repetition rate. The reading on the voltmeter is then adjusted by means of variable resistor R1 or R2 to obtain the dose-rate reading corresponding to the correct value, which is derived from the predetermined values of pulse amplitude and frequency.

It will of course be understood by those skilled in the art that the spectrum-to-dose conversion can be accomplished using a digital computer. In that case the digital signals from the pulse height analyzer are digitally weighted with the predetermined pulse-height-to-dose function. The signal from each channel is then integrated to produce accumulated dose.

The dose rate from three different sources of gamma radiation—$Cs^{137}$, $Mn^{54}$ and $Hg^{203}$—were measured with apparatus of the type depicted in FIGS. 3 and 4. The theoretical dose from these sources was computed from the strength of the source, as calibrated from a U.S. Bureau of Standards source, and from the geometrical solid angle of the source radiation incident on the detector. The calculated dose was then compared with the readings on the voltmeter. The results are shown in Table I.

The response of the system to changes in dose was limited only by the response-time of the particular voltmeter used to display dose. A comparison of the measured and calculated dose rate indicates good agreement and demonstrates the practicality of real time spectrum-to-dose conversion in accordance with the method of the invention using only a two-channel pulse height analyzer. Greater accuracy could, of course, be expected from an analyzer having more channels.

It is apparent that other variations and modifications may be made without departing from the present invention. Accordingly, it should be understood that the form of the present invention described above and shown in the accompanying drawing is illustrative only and not intended to limit the scope of the invention.

What is claimed is:

1. In a system for measuring radiation dose wherein a spectrometer responds to incident radiation and produces output signals having pulse heights related to the energy deposited in the spectrometer, the spectrometer having a response matrix and an energy-to-dose function, and wherein an analyzer means responsive to the spectrometer output transforms the signals therefrom into digital counts representative of pulse height increments, the combination therewith of:

converter means for receiving the digital counts of each increment and for weighting the counts of each increment in accordance with a pulse-height-to-dose function thereby converting the spectrometer output signals into dose pulses, said pulse-height-to-dose function being related to the spectrometer's response matrix and the energy-to-dose function.

2. In a system for measuring radiation dose as set forth in claim 1 wherein said converter means comprises means for weighting each increment in accordance with the pulse-height-to-dose function:

$$F=R^{-1}d$$

where
$F$=the weighting function,
$R^{-1}$=the inverse response matrix of the spectrometer,
$d$=[a spectrum-] an energy-to-dose conversion function.

3. In a system for measuring radiation dose as set forth in claim 1 wherein said converter means comprises means for weighting each increment in accordance with a pulse-height-to-dose function determined by an iterative process using the equation:

$$NF=\epsilon^{-1}d$$

where
$F$=the weighting function,
$N$=a column-normalized matrix,
$\epsilon$=a diagonal efficiency matrix, and
$d$=a column matrix composed of the non-zero elements of an energy-to-dose conversion function.

4. In a system for measuring radiation dose in claim 1 including means for displaying the dose pulses as a radiation dose rate.

5. In a system for measuring radiation dose as set forth in claim 1 including means for summing the dose pulses to produce an accumulated radiation dose signal.

6. In a system for measuring radiation dose as set forth in claim 1 including means for classifying the radiation incident on the spectrometer into components and producing a digital signal for each component to be received by said converter means to apply the appropriate pulse-height-to-dose function to each component of incident radiation.

7. A system for measuring-radiation dose wherein a spectrometer responds to incident radiation and produces output signals having pulse heights related to the energy deposited in the spectrometer, the spectrometer having a response matrix and an energy-to-dose function, comprising:

means responsive to the spectrometer output for pulse-height analyzing and for transforming the spectrometer output into digital counts representative of pulse-height increments of radiation, means for receiving the digital counts and for weighting the counts of each increment in accordance with a pulse-height-to-dose function thereby converting the spectrometer output signals into dose pulses, said pulse-height-to-dose function being related to the spectrometer's response matrix and the energy-to-dose function, means for displaying the dose pulses as a radiation dose rate, and means for summing the dose pulses to produce an accumulated dose signal.

8. A system for measuring radiation dose as set forth in claim 7 wherein said means for receiving the digital counts of each increment comprises converter means for weighting said counts in accordance with the pusle-height-to-dose function:

$$F=R^{-1}d$$

where
F=the weighting function,
$R^{-1}$=the inverse response matrix of the spectrometer,
$d$=an energy-to-dose conversion function.

9. A system for measuring radiation dose as set forth in claim 7 wherein said means for receiving the digital counts of each increment comprises converter means for weighting said counts in accordance with a pulse-height-to-dose function determined by an iterative process using the equation:

$$NF=\epsilon^{-1}d$$

where
- $F$ = the weighting function,
- $N$ = a column-normalized matrix,
- $\epsilon$ = a diagonal efficiency matrix, and
- $d$ = a column matrix composed of the nonzero elements of an energy-to-dose conversion function.

10. A system for measuring radiation dose as set forth in claim 7 including means for classifying the radiation incident on the spectrometer into components and producing a digital signal for each component to be received by said means for weighting the counts of each increment to apply an appropriate pulse-height-to-dose function to each component of incident radiation.

11. A system for measuring radiation dose, comprising:
    a gamma-ray spectrometer responsive to incident radiation and producing output signals having pulse heights related to the energy deposited in the spectrometer, the spectrometer having a response matrix and an energy-to-dose function,
    a multiple-channel pulse height analyzer responsive to the spectrometer output for transforming the signals therefrom into digital counts representative of pulse height increments of radiation, each series of such counts being related to one level of the spectra incident on the spectrometer, and
    converter means for receiving the digital counts of each increment of radiation and for weighting said counts in accordance with a pulse-height-to-dose function thereby converting the spectrometer output signals into dose pulses, said pulse-height-to-dose function being related to thespectrometer's response matrix and the energy-to-dose function.

12. A system for measuring radiation dose as set forth in claim 11 including a voltmeter responsive to the dose pulses and calibrated to read radiation dosage in volts.

13. A method for measuring radiation dose wherein a spectrometer responds to incident radiation and produces output signals having pulse-heights related to he energy deposited in the spectrometer, the spectrometer having a response matrix and an energy-to-dose function, comprising the steps of:
    analyzing the spectrometer output and transforming said transformation output into digital counts representative of pulse height increments, and
    converting the digital counts into dose pulses by weighting the counts of each increment in accordance with a pulse-height-to-dose function, said pulse-height-to-dose function being related to the spectrometer's matrix and the energy-tondose function.

14. A method of measuring a radiation dose as set forth in claim 13 wherein the digital counts are weighted in accordance with the pulse-height-to-dose function:
$$F = R^{-1} d$$
where
- $F$ = the weighting function,
- $R^{-1}$ = the inverse response matrix of the spectrometer,
- $d$ = an energy-to-dose function.

15. A method of measuring radiation dose as set forth in claim 13 wherein the digital counts are weighted in accordance with a pulse-height-to-dose function determined by an iterative process using the equation:
$$NF = \epsilon^{-1} d$$
where
- $F$ = the weighting function,
- $N$ = a column-normalized matrix,
- $\epsilon$ = a diagonal efficiency matrix, and
- $d$ = a column matrix composed of the nonzero elements of an energy-to-dose conversion function.

16. A method of measuring radiation dose wherein a spectrometer responds to incident radiation and produces output signals having pulse heights related to the energy deposited in the spectrometer, the spectrometer having a response matrix and an energy-to-dose function, comprising the steps of:
    transforming the spectrometer output signals into digital counts representative of pulse height increments,
    classifying the spectrometer output signals into the different radiation components thereof,
    generating a digital signal for each component, and
    converting the digital counts of each increment of radiation for each component into dose pulses by weighting in accordance with a pulse-height-to-dose, said pulse-height-to-dose function being related to the spectrometer's response matrix and the energy-to-dose function.

17. A method for measuring radiation dose as set forth in claim 16 including the step of integrating the dose pulses for each component of radiation incident on the spectrometer to produce an accumulated radiation level signal for each component.

18. A method for measuring radiation dose as set forth in claim 16 including the step of displaying the dose pulses as a radiation dose rate.

19. A method for measuring radiation dose as set forth in claim 16 including the step of discriminating the output signals from the spectrometer to eliminate noise and electrical pulses of beyond a predetermined amplitude limit prior to the step of transforming the spectrometer output.

* * * * *